United States Patent
Anand et al.

(10) Patent No.: US 10,425,799 B2
(45) Date of Patent: Sep. 24, 2019

(54) SYSTEM AND METHOD FOR CALL MANAGEMENT

(71) Applicant: RAPIDSOS, INC., New York, NY (US)

(72) Inventors: Preet Anand, San Mateo, CA (US); Peter Antypas, Emeryville, CA (US); Motiejus Osipovas, Edmonton (CA)

(73) Assignee: RAPIDSOS, INC., New York, NY (US)

( * ) Notice: Subject to any disclaimer, the term of this patent is extended or adjusted under 35 U.S.C. 154(b) by 0 days.

(21) Appl. No.: 15/958,186

(22) Filed: Apr. 20, 2018

(65) Prior Publication Data

US 2018/0242133 A1    Aug. 23, 2018

Related U.S. Application Data

(63) Continuation of application No. 15/436,484, filed on Feb. 17, 2017, now Pat. No. 9,992,655, which is a
(Continued)

(51) Int. Cl.
*H04W 4/90* (2018.01)
*H04W 4/02* (2018.01)
(Continued)

(52) U.S. Cl.
CPC .............. *H04W 4/90* (2018.02); *G01S 5/14* (2013.01); *G01S 19/46* (2013.01); *H04W 4/02* (2013.01);
(Continued)

(58) Field of Classification Search
CPC ....................................................... H04W 4/90
(Continued)

(56) References Cited

U.S. PATENT DOCUMENTS

| 5,379,337 A | 1/1995 | Castillo et al. |
| 5,479,482 A | 12/1995 | Grimes |

(Continued)

FOREIGN PATENT DOCUMENTS

| CA | 2662606 A1 | 10/2009 |
| CA | 2697986 A1 | 9/2010 |

(Continued)

OTHER PUBLICATIONS

Abel et al. Semantics+Filtering+Search=Twitcident exploring information in social web streams. HT'12—Proceedings of 23rd ACM Conference on Hypertext and Social Media (10 pgs) (2012).
(Continued)

*Primary Examiner* — Qutbuddin Ghulamali
(74) *Attorney, Agent, or Firm* — Wilson Sonsini Goodrich & Rosati (57) ABSTRACT

A system and method are provided in accordance with the various aspects of the invention that enhance the information regarding a caller and a call location. Such calls are typically sent to a dispatcher that handles urgent or emergency calls. The information provided can be in the form of a message that is includes specifics about the call initiator and the nature of and/or reason for the call; a message that is converted to verbal form from text-to-speech; and/or the message may include location information, especially as it relates to representing a wireless device as a landline location based on nearby communication options, such as Wi-Fi or Bluetooth beacons.

20 Claims, 6 Drawing Sheets

Related U.S. Application Data continuation of application No. 14/794,780, filed on Jul. 8, 2015, now Pat. No. 9,838,858.

(60) Provisional application No. 62/021,709, filed on Jul. 8, 2014.

(51) Int. Cl.
*H04W 76/50* (2018.01)
*G01S 5/14* (2006.01)
*G01S 19/46* (2010.01)
*H04L 29/08* (2006.01)
*H04W 80/12* (2009.01)

(52) U.S. Cl.
CPC ........... *H04W 4/025* (2013.01); *H04W 76/50* (2018.02); *H04L 67/02* (2013.01); *H04W 80/12* (2013.01)

(58) Field of Classification Search
USPC .................. 340/404.2; 455/404.2, 404.1
See application file for complete search history.

(56) References Cited

U.S. PATENT DOCUMENTS

| | | | |
|---|---|---|---|
| 5,563,931 | A | 10/1996 | Bishop et al. |
| 5,596,625 | A | 1/1997 | Leblanc |
| 5,710,803 | A | 1/1998 | Kowal et al. |
| 5,742,666 | A | 4/1998 | Alpert |
| 6,014,555 | A | 1/2000 | Tendler |
| 6,133,853 | A | 10/2000 | Obradovich et al. |
| 6,249,674 | B1 | 6/2001 | Verdonk |
| 6,252,943 | B1 | 6/2001 | Johnson et al. |
| 6,256,489 | B1 | 7/2001 | Lichter et al. |
| 6,262,655 | B1 | 7/2001 | Yoshioka et al. |
| 6,363,138 | B1 | 3/2002 | Aprile |
| 6,459,782 | B1 | 10/2002 | Bedrosian et al. |
| 6,477,362 | B1 | 11/2002 | Raith et al. |
| 6,502,030 | B2 | 12/2002 | Hilleary |
| 6,510,315 | B1 | 1/2003 | Arnson |
| 6,556,816 | B1 | 4/2003 | Gafrick et al. |
| 6,571,092 | B2 | 5/2003 | Faccin et al. |
| 6,574,323 | B1 | 6/2003 | Manuel et al. |
| 6,587,545 | B1 | 7/2003 | Antonucci et al. |
| 6,594,666 | B1 | 7/2003 | Biswas et al. |
| 6,600,812 | B1 | 7/2003 | Gentillin et al. |
| 6,628,933 | B1 | 9/2003 | Humes |
| 6,707,421 | B1 | 3/2004 | Drury et al. |
| 6,731,610 | B2 | 5/2004 | Sajikawa et al. |
| 6,993,118 | B2 | 1/2006 | Antonucci et al. |
| 7,054,611 | B2 | 5/2006 | Eisner et al. |
| 7,058,385 | B2 | 6/2006 | Lauper |
| 7,177,400 | B2 | 2/2007 | Eisner et al. |
| 7,224,773 | B2 | 5/2007 | Croak et al. |
| 7,271,704 | B2 | 9/2007 | McSheffrey et al. |
| 7,324,801 | B2 | 1/2008 | Droste et al. |
| 7,349,706 | B2 | 3/2008 | Kim et al. |
| 7,409,044 | B2 | 8/2008 | Leduc |
| 7,436,938 | B2 | 10/2008 | Savaglio et al. |
| 7,437,143 | B1 | 10/2008 | Williams |
| 7,469,138 | B2 | 12/2008 | Dayar et al. |
| 7,483,519 | B2 | 1/2009 | Binning |
| 7,519,351 | B2 | 4/2009 | Malone |
| 7,519,372 | B2 | 4/2009 | MacDonald et al. |
| 7,548,158 | B2 | 6/2009 | Titus et al. |
| 7,565,131 | B2 | 7/2009 | Rollender |
| 7,646,854 | B2 | 1/2010 | Anderson |
| 7,676,215 | B2 | 3/2010 | Chin et al. |
| 7,684,782 | B2 | 3/2010 | Ashley, Jr. et al. |
| 7,848,733 | B2 | 12/2010 | Bull et al. |
| 7,937,067 | B2 | 5/2011 | Maier et al. |
| 7,949,326 | B2 | 5/2011 | Gallagher et al. |
| 8,009,810 | B2 | 8/2011 | Seidberg et al. |
| 8,041,335 | B2 | 10/2011 | Khetawat et al. |
| 8,041,341 | B1 | 10/2011 | Malackowski et al. |
| 8,045,954 | B2 | 10/2011 | Barbeau et al. |
| 8,068,881 | B2 * | 11/2011 | Schrager ............ H04M 1/6066 379/88.01 |
| 8,102,972 | B2 | 1/2012 | Poremba |
| 8,126,424 | B2 | 2/2012 | Piett et al. |
| 8,150,367 | B1 | 4/2012 | Malladi et al. |
| 8,165,560 | B2 | 4/2012 | Stenquist |
| 8,165,562 | B2 | 4/2012 | Piett et al. |
| 8,185,087 | B2 | 5/2012 | Mitchell, Jr. et al. |
| 8,195,121 | B2 | 6/2012 | Dunn et al. |
| 8,219,135 | B2 | 7/2012 | De Amorim et al. |
| 8,244,205 | B2 | 8/2012 | Wu |
| 8,249,546 | B1 | 8/2012 | Shah et al. |
| 8,249,547 | B1 | 8/2012 | Fellner |
| 8,289,953 | B2 | 10/2012 | Ray et al. |
| 8,306,501 | B2 | 11/2012 | Moodbidri et al. |
| 8,326,260 | B1 | 12/2012 | Bradish et al. |
| 8,369,488 | B2 | 2/2013 | Sennett et al. |
| 8,401,565 | B2 | 3/2013 | Sandberg et al. |
| 8,417,090 | B2 | 4/2013 | Fleming |
| 8,417,212 | B2 | 4/2013 | Cepuran et al. |
| 8,442,481 | B2 | 5/2013 | Maier et al. |
| 8,442,482 | B2 | 5/2013 | Maier et al. |
| 8,472,973 | B2 | 6/2013 | Lin et al. |
| 8,484,352 | B2 | 7/2013 | Piett et al. |
| 8,489,062 | B2 | 7/2013 | Ray et al. |
| 8,509,729 | B2 | 8/2013 | Shaw |
| 8,516,122 | B2 | 8/2013 | Piett et al. |
| 8,538,370 | B2 | 9/2013 | Ray et al. |
| 8,538,468 | B2 | 9/2013 | Daly |
| 8,594,015 | B2 | 11/2013 | Dunn et al. |
| 8,606,218 | B2 | 12/2013 | Ray et al. |
| 8,625,578 | B2 | 1/2014 | Roy et al. |
| 8,626,112 | B2 | 1/2014 | Ray et al. |
| 8,630,609 | B2 | 1/2014 | Ray et al. |
| 8,644,301 | B2 | 2/2014 | Tamhankar et al. |
| 8,649,806 | B2 | 2/2014 | Cuff et al. |
| 8,682,279 | B2 | 3/2014 | Rudolf et al. |
| 8,682,281 | B2 | 3/2014 | Dunn et al. |
| 8,682,286 | B2 | 3/2014 | Dickinson et al. |
| 8,712,366 | B2 | 4/2014 | Greene et al. |
| 8,747,336 | B2 | 6/2014 | Tran |
| 8,751,265 | B2 | 6/2014 | Piett et al. |
| 8,755,767 | B2 | 6/2014 | Maier et al. |
| 8,760,290 | B2 | 6/2014 | Piett et al. |
| 8,811,935 | B2 | 8/2014 | Faccin et al. |
| 8,825,687 | B2 | 9/2014 | Marceau et al. |
| 8,848,877 | B2 | 9/2014 | Seidberg et al. |
| 8,866,606 | B1 | 10/2014 | Will et al. |
| 8,868,028 | B1 | 10/2014 | Kaltsukis |
| 8,880,021 | B2 | 11/2014 | Hawkins |
| 8,890,685 | B1 | 11/2014 | Sookman et al. |
| 8,918,075 | B2 | 12/2014 | Maier et al. |
| 8,948,732 | B1 * | 2/2015 | Negahban ............ H04W 4/90 455/414.1 |
| 8,971,839 | B2 | 3/2015 | Hong |
| 8,984,143 | B2 | 3/2015 | Serra et al. |
| 9,008,078 | B2 | 4/2015 | Kamdar et al. |
| 9,014,657 | B2 | 4/2015 | Rohde et al. |
| 9,019,870 | B2 | 4/2015 | Khan et al. |
| 9,071,643 | B2 | 6/2015 | Saito et al. |
| 9,077,676 | B2 | 7/2015 | Price et al. |
| 9,078,092 | B2 | 7/2015 | Piett et al. |
| 9,094,816 | B2 * | 7/2015 | Maier .................. H04W 4/025 |
| 9,129,219 | B1 | 9/2015 | Robertson et al. |
| 9,167,379 | B1 | 10/2015 | Hamilton et al. |
| 9,244,922 | B2 | 1/2016 | Marceau et al. |
| 9,258,680 | B2 | 2/2016 | Drucker |
| 9,277,389 | B2 | 3/2016 | Saito et al. |
| 9,351,142 | B2 | 5/2016 | Basore et al. |
| 9,369,847 | B2 | 6/2016 | Borghei |
| 9,384,491 | B1 | 7/2016 | Briggs et al. |
| 9,402,159 | B1 | 7/2016 | Self et al. |
| 9,408,051 | B2 | 8/2016 | Finney et al. |
| 9,420,099 | B1 | 8/2016 | Krishnan et al. |
| 9,503,876 | B2 | 11/2016 | Saito et al. |
| 9,544,750 | B1 | 1/2017 | Self et al. |
| 9,591,467 | B2 | 3/2017 | Piett et al. |

(56) References Cited

U.S. PATENT DOCUMENTS

| | | |
|---|---|---|
| 9,635,534 B2 | 4/2017 | Maier et al. |
| 9,659,484 B1 | 5/2017 | Mehta et al. |
| 9,693,213 B2 | 6/2017 | Self et al. |
| 9,734,721 B2 | 8/2017 | Stenneth et al. |
| 9,736,670 B2 | 8/2017 | Mehta et al. |
| 9,756,169 B2 | 9/2017 | Mehta et al. |
| 9,805,430 B2 | 10/2017 | Miasnik et al. |
| 9,838,858 B2 | 12/2017 | Anand et al. |
| 9,924,043 B2 | 3/2018 | Mehta et al. |
| 9,942,739 B2 | 4/2018 | Bozik et al. |
| 10,089,854 B2 | 10/2018 | Hender et al. |
| 10,142,213 B1 | 11/2018 | Hart et al. |
| 2001/0051849 A1 | 12/2001 | Boone |
| 2002/0001367 A1 | 1/2002 | Lee |
| 2002/0027975 A1 | 3/2002 | Oxley |
| 2002/0057678 A1 | 5/2002 | Jiang et al. |
| 2002/0120698 A1 | 8/2002 | Tamargo |
| 2003/0069035 A1 | 4/2003 | Shurvinton |
| 2003/0109245 A1 | 6/2003 | McCalmont et al. |
| 2004/0203572 A1 | 10/2004 | Aerrabotu et al. |
| 2004/0266390 A1 | 12/2004 | Faucher et al. |
| 2005/0085215 A1 | 4/2005 | Kokko et al. |
| 2005/0104745 A1 | 5/2005 | Bachelder et al. |
| 2005/0151642 A1 | 7/2005 | Tupler et al. |
| 2005/0222829 A1 | 10/2005 | Dumas |
| 2005/0282518 A1 | 12/2005 | Evelyn et al. |
| 2006/0109960 A1 | 5/2006 | Evelyn et al. |
| 2006/0293024 A1 | 12/2006 | Benco et al. |
| 2007/0030144 A1 | 2/2007 | Titus et al. |
| 2007/0030146 A1 | 2/2007 | Shepherd |
| 2007/0033095 A1 | 2/2007 | Hodgin et al. |
| 2007/0049287 A1 | 3/2007 | Dunn |
| 2007/0053308 A1 | 3/2007 | Dumas et al. |
| 2007/0058528 A1 | 3/2007 | Massa et al. |
| 2007/0060097 A1 | 3/2007 | Edge et al. |
| 2007/0161383 A1 | 7/2007 | Caci |
| 2007/0164872 A1 | 7/2007 | Monroe |
| 2007/0218895 A1 | 9/2007 | Saito et al. |
| 2008/0019268 A1 | 1/2008 | Rollins |
| 2008/0063153 A1 | 3/2008 | Krivorot et al. |
| 2008/0077474 A1 | 3/2008 | Dumas et al. |
| 2008/0081646 A1 | 4/2008 | Morin et al. |
| 2008/0166990 A1 | 7/2008 | Toiv |
| 2008/0194238 A1 | 8/2008 | Kwon |
| 2008/0253535 A1 | 10/2008 | Sherry et al. |
| 2008/0294058 A1 | 11/2008 | Shklarski |
| 2009/0186596 A1 | 7/2009 | Kaltsukis et al. |
| 2009/0257345 A1 | 10/2009 | King |
| 2009/0322513 A1 | 12/2009 | Hwang et al. |
| 2010/0002846 A1 | 1/2010 | Ray et al. |
| 2010/0003964 A1 | 1/2010 | Khare et al. |
| 2010/0156626 A1 | 6/2010 | Story |
| 2010/0159871 A1 | 6/2010 | Tester |
| 2010/0159976 A1 | 6/2010 | Marocchi et al. |
| 2010/0166153 A1 | 7/2010 | Guleria et al. |
| 2010/0202368 A1 | 8/2010 | Hans |
| 2010/0238018 A1 | 9/2010 | Kelly |
| 2010/0262668 A1 | 10/2010 | Piett et al. |
| 2011/0009086 A1 | 1/2011 | Poremba et al. |
| 2011/0029600 A1 | 2/2011 | Theimer |
| 2011/0071880 A1 | 3/2011 | Spector |
| 2011/0086607 A1 | 4/2011 | Wang et al. |
| 2011/0103266 A1 | 5/2011 | Andreasen et al. |
| 2011/0134897 A1 | 6/2011 | Montemurro et al. |
| 2011/0153368 A1 | 6/2011 | Pierre et al. |
| 2011/0201357 A1 | 8/2011 | Garrett et al. |
| 2011/0263219 A1 | 10/2011 | Hasenfang et al. |
| 2011/0263319 A1 | 10/2011 | Haemaelaeinen et al. |
| 2012/0002792 A1 | 1/2012 | Chang |
| 2012/0028599 A1 | 2/2012 | Hatton et al. |
| 2012/0029970 A1 | 2/2012 | Stiles et al. |
| 2012/0092161 A1 | 4/2012 | West |
| 2012/0144019 A1 | 6/2012 | Zhu et al. |
| 2012/0157795 A1 | 6/2012 | Chiu et al. |
| 2012/0202428 A1 | 8/2012 | Mirbaha et al. |
| 2012/0210325 A1 | 8/2012 | De Lind Van Wijngaarden et al. |
| 2012/0218102 A1 | 8/2012 | Bivens et al. |
| 2012/0257729 A1 | 10/2012 | Piett et al. |
| 2012/0258680 A1 | 10/2012 | Piett et al. |
| 2012/0289243 A1 | 11/2012 | Tarlow et al. |
| 2012/0295575 A1 | 11/2012 | Nam |
| 2012/0309341 A1 | 12/2012 | Ward |
| 2013/0005295 A1 | 1/2013 | Park et al. |
| 2013/0030825 A1 | 1/2013 | Bagwandeen et al. |
| 2013/0084824 A1 | 4/2013 | Hursey |
| 2013/0122932 A1 | 5/2013 | Patel et al. |
| 2013/0138791 A1 | 5/2013 | Thomas et al. |
| 2013/0183924 A1* | 7/2013 | Saigh .................. H04W 4/029 455/404.2 |
| 2013/0185368 A1 | 7/2013 | Nordstrom et al. |
| 2013/0203373 A1 | 8/2013 | Edge |
| 2013/0203376 A1 | 8/2013 | Maier et al. |
| 2013/0226369 A1 | 8/2013 | Yorio et al. |
| 2013/0237175 A1 | 9/2013 | Piett |
| 2013/0237181 A1 | 9/2013 | Ray |
| 2013/0331055 A1 | 12/2013 | McKown et al. |
| 2014/0051379 A1 | 2/2014 | Ganesh et al. |
| 2014/0086108 A1 | 3/2014 | Dunn et al. |
| 2014/0087680 A1 | 3/2014 | Luukkala et al. |
| 2014/0113606 A1 | 4/2014 | Morken et al. |
| 2014/0126356 A1 | 5/2014 | Lee et al. |
| 2014/0148120 A1 | 5/2014 | Buck |
| 2014/0155018 A1 | 6/2014 | Fan et al. |
| 2014/0164505 A1 | 6/2014 | Daly et al. |
| 2014/0199959 A1 | 7/2014 | Hassan et al. |
| 2014/0248848 A1 | 9/2014 | Mufti et al. |
| 2014/0257846 A1 | 9/2014 | Hermiz et al. |
| 2014/0302810 A1 | 10/2014 | Inha et al. |
| 2014/0324351 A1 | 10/2014 | Dannevik et al. |
| 2014/0368601 A1 | 12/2014 | Decharms |
| 2015/0029836 A1 | 1/2015 | Hans et al. |
| 2015/0055453 A1 | 2/2015 | Chaki et al. |
| 2015/0081209 A1 | 3/2015 | Yeh et al. |
| 2015/0094095 A1 | 4/2015 | Johnson et al. |
| 2015/0099481 A1 | 4/2015 | Maitre et al. |
| 2015/0109125 A1 | 4/2015 | Kaib et al. |
| 2015/0111524 A1 | 4/2015 | South et al. |
| 2015/0137972 A1 | 5/2015 | Nepo et al. |
| 2015/0172897 A1 | 6/2015 | Mariathasan et al. |
| 2015/0181401 A1 | 6/2015 | Dhandu et al. |
| 2015/0289121 A1 | 10/2015 | Lesage et al. |
| 2015/0304827 A1 | 10/2015 | Price et al. |
| 2015/0317392 A1 | 11/2015 | Fernandez |
| 2015/0317809 A1 | 11/2015 | Chellappan et al. |
| 2015/0319284 A1 | 11/2015 | Leonessi |
| 2015/0350262 A1 | 12/2015 | Rainisto et al. |
| 2015/0358794 A1 | 12/2015 | Nokhoudian et al. |
| 2015/0365319 A1 | 12/2015 | Finn et al. |
| 2016/0004224 A1 | 1/2016 | Pi |
| 2016/0026768 A1 | 1/2016 | Singh et al. |
| 2016/0088455 A1 | 3/2016 | Bozik et al. |
| 2016/0219084 A1 | 7/2016 | Abiezzi |
| 2016/0219397 A1 | 7/2016 | Mayor et al. |
| 2016/0227589 A1 | 8/2016 | Marshall et al. |
| 2016/0269535 A1 | 9/2016 | Balabhadruni et al. |
| 2016/0307436 A1 | 10/2016 | Nixon |
| 2016/0315923 A1 | 10/2016 | Riscombe-Burton et al. |
| 2016/0330769 A1 | 11/2016 | Edge |
| 2016/0337831 A1 | 11/2016 | Piett et al. |
| 2016/0345171 A1 | 11/2016 | Kulkarni et al. |
| 2016/0363931 A1 | 12/2016 | Yang et al. |
| 2016/0371973 A1 | 12/2016 | Holleczek et al. |
| 2017/0004427 A1 | 1/2017 | Bruchal et al. |
| 2017/0046216 A1 | 2/2017 | Stenneth et al. |
| 2017/0140637 A1 | 5/2017 | Thurlow et al. |
| 2017/0142568 A1 | 5/2017 | Saito et al. |
| 2017/0150335 A1 | 5/2017 | Self et al. |
| 2017/0161614 A1 | 6/2017 | Mehta et al. |
| 2017/0164175 A1 | 6/2017 | Bozik et al. |
| 2017/0171735 A1 | 6/2017 | Anand et al. |
| 2017/0180486 A1 | 6/2017 | Mehta et al. |
| 2017/0180963 A1 | 6/2017 | Cavendish et al. |
| 2017/0180966 A1* | 6/2017 | Piett .................. H04W 4/025 |
| 2017/0213251 A1 | 7/2017 | Nunally et al. |

(56) References Cited

U.S. PATENT DOCUMENTS

| | | | |
|---|---|---|---|
| 2017/0238129 A1* | 8/2017 | Maier | H04W 4/02 |
| | | | 455/404.2 |
| 2017/0238136 A1* | 8/2017 | Smith | H04W 4/029 |
| | | | 455/456.3 |
| 2017/0245113 A1* | 8/2017 | Hooker | H04W 4/023 |
| 2017/0245130 A1 | 8/2017 | Mehta et al. | |
| 2017/0251347 A1 | 8/2017 | Mehta et al. | |
| 2017/0316698 A1 | 11/2017 | Stenneth et al. | |
| 2017/0325056 A1 | 11/2017 | Mehta et al. | |
| 2017/0330447 A1 | 11/2017 | Mehta et al. | |
| 2018/0020091 A1* | 1/2018 | Self | H04W 4/90 |
| 2018/0039737 A1 | 2/2018 | Dempers et al. | |
| 2018/0053401 A1 | 2/2018 | Martin et al. | |
| 2018/0077282 A1 | 3/2018 | Herron et al. | |

FOREIGN PATENT DOCUMENTS

| | | |
|---|---|---|
| CA | 2773749 A1 | 10/2012 |
| CA | 2773881 A1 | 10/2012 |
| CA | 2790501 A1 | 3/2013 |
| CA | 2809421 A1 | 9/2013 |
| CA | 2646607 C | 9/2016 |
| CA | 2886535 A1 | 10/2016 |
| CN | 106021508 A | 10/2016 |
| JP | 2012222443 A | 11/2012 |
| KR | 20090019606 A | 2/2009 |
| KR | 20090092900 A | 9/2009 |
| KR | 20100055746 A | 5/2010 |
| KR | 101305286 B1 | 9/2013 |
| KR | 20140052780 A | 5/2014 |
| KR | 20140093568 A | 7/2014 |
| KR | 20150097031 A | 8/2015 |
| KR | 101602482 B1 | 3/2016 |
| KR | 101612423 B1 | 4/2016 |
| KR | 20160097933 A | 8/2016 |
| WO | WO-0022593 A1 | 4/2000 |
| WO | WO-0167419 A2 | 9/2001 |
| WO | WO-2007109599 A2 | 12/2007 |
| WO | WO-2012129561 A1 | 9/2012 |
| WO | WO-2014025563 A1 | 2/2014 |
| WO | WO-2014074420 A1 | 5/2014 |
| WO | WO-2014176646 A1 | 11/2014 |
| WO | WO-2015127867 A1 | 9/2015 |
| WO | WO-2016044540 A1 | 3/2016 |
| WO | WO-2017079354 A1 | 5/2017 |
| WO | WO-2017083571 A1 | 5/2017 |
| WO | WO-2017100220 A1 | 6/2017 |
| WO | WO-2017106775 A1 | 6/2017 |
| WO | WO-2017112820 A1 | 6/2017 |
| WO | WO-2017189610 A2 | 11/2017 |
| WO | WO-2017196753 A1 | 11/2017 |
| WO | WO-2018039142 A1 | 3/2018 |

OTHER PUBLICATIONS

ArcGIS Rest Services Directory. Folder: TIGERWeb. Available at https://tigerweb.geo.census.gov/arcgis/rest/services/TIGERweb. (1 pg.) (Accessed Sep. 2017).
Chowdhury et al. Tweet4act: Using incident-specific profiles for classifying crisis-related messages. Proceedings of the 10th International ISCRAM Conference (pp. 834-839) (2013).
Co-pending U.S Appl. No. 15/880,208, filed Jan. 25, 2018.
Co-pending U.S Appl. No. 15/958,398, filed Apr. 20, 2018.
Co-pending U.S Appl. No. 15/960,384, filed Apr. 23, 2018.
Co-pending U.S Appl. No. 15/976,600, filed May 10, 2018.
Homeland Security Science and Technology. Using Social Media for Enhanced Situational Awareness and Decision Support. Virtual Social Medial Working Group and DHS First Responders Group. (44 pgs.) (Jun. 2014).
Marcus et al. TwitInfo: Aggregating and Visualizing Microblogs for Event Exploration. ACM CHI Conference 2011 (10 pgs).
Meier. MatchApp: Next Generation Disaster Response App? iRevolution (12 pgs.) (Feb. 27, 2013).
National Emergency Number Association (NENA). Social Networking in 9-1-1 PSAPs Information Document. Available at https://c.ymcdn.com/sites/www.nena.org/resource/resmgr/Standards/NENA-INF-001.1.1-2012_Social (18 pgs) (2012).
National Emergency Number Association (NENA) Technical Committee Chairs: NENA Functional and Interface Standards for Next Generation 9-1-1 Version 1.0 (i3). (Dec. 18, 2017). Retrieved from the Internet: URL:https://c.ymcdn.com/sites/nena.site-ym.com/resource/collection/2851C951-69FF-40F0-A6B8-36A714CB085D/NENA_08-002-v1_Functional_Interface_Standards_NG911_i3.pdf [retrieved on Feb. 5, 2018] (121 pgs).
PCT/US2015/050609 International Preliminary Report on Patentability dated Mar. 30, 2017.
PCT/US2015/050609 International Search Report and Written Opinion dated Dec. 16, 2015.
PCT/US2016/060189 International Search Report and Written Opinion dated Feb. 24, 2017.
PCT/US2016/065212 International Search Report and Written Opinion dated Feb. 20, 2017.
PCT/US2016/067366 International Search Report and Written Opinion dated Mar. 31, 2017.
PCT/US2016/068134 International Search Report and Written Opinion dated Apr. 21, 2017.
PCT/US2017/029465 International Search Report and Written Opinion dated Aug. 9, 2017.
PCT/US2017/031605 International Search Report and Written Opinion dated Jul. 31, 2017.
PCT/US2017/047854 International Search Report and Written Opinion dated Nov. 28, 2017.
Seattle Real Time Fire 911 Calls. Available at https://catalog.data.gov/dataset/seattle-real-time-fire-911-calls-6cdf3 (3 pgs.) (Accessed Sep. 2017).
Tazaki. Floating Ground: An Architecture for Network Mobility and Ad Hoc Network Convergence. Thesis. Graduate School of Media and Governance Keio University 5322 Endo Fujisawa, Kanagawa, Japan 2520882 (pp. 1-162) (2010).
U.S. Census Bureau. Developers: Population Estimates APIs. Available at https://www.census.gov/data/developers/data-sets/popest-popproj/popest.html (2 pgs.) (Accessed Sep. 2017).
U.S. Appl. No. 14/794,780 Office Action dated Feb. 2, 2016.
U.S. Appl. No. 14/794,780 Office Action dated Mar. 7, 2017.
U.S. Appl. No. 14/794,780 Office Action dated Nov. 15, 2016.
U.S. Appl. No. 14/856,818 Office Action dated Apr. 12, 2017.
U.S. Appl. No. 15/387,363 Office Action dated Jul. 6, 2017.
U.S. Appl. No. 15/387,363 Office Action dated Mar. 15, 2017.
U.S. Appl. No. 15/436,379 Office Action dated Apr. 6, 2017.
U.S. Appl. No. 15/436,379 Office Action dated Nov. 2, 2017.
U.S. Appl. No. 15/436,484 Office Action dated May 8, 2017.
U.S. Appl. No. 15/436,484 Office Action dated Sep. 14, 2017.
U.S. Appl. No. 15/444,133 Office Action dated Apr. 4, 2017.
U.S. Appl. No. 15/444,133 Office Action dated Aug. 17, 2017.
U.S. Appl. No. 15/497,067 Office Action dated Jun. 23, 2017.
U.S. Appl. No. 15/588,343 Office Action dated Feb. 26, 2018.
U.S. Appl. No. 15/589,847 Office Action dated Jun. 23, 2017.
U.S. Appl. No. 15/589,847 Office Action dated Nov. 30, 2017.
U.S. Appl. No. 15/667,531 Office Action dated Apr. 5, 2018.
U.S. Appl. No. 15/667,531 Office Action dated Nov. 8, 2017.
Weather Company Data for IBM Bluemix APIs. Available at https://twcservice.mybluemix.net/rest-api/ (100 pgs) (Accessed Sep. 2017).
Co-pending U.S. Appl. No. 16/150,099, filed Oct. 2, 2018.
Co-pending U.S. Appl. No. 16/162,171, filed Oct. 16, 2016.
Co-pending U.S. Appl. No. 16/178,476, filed Nov. 1, 2018.
Co-pending U.S. Appl. No. 16/209,892, filed Dec. 4, 2018.
Co-pending U.S. Appl. No. 16/271,634, filed Feb. 8, 2019.
PCT/US2016/060189 International Preliminary Report on Patentability dated May 17, 2018.
PCT/US2016/065212 International Preliminary Report on Patentability dated Jun. 21, 2018.
PCT/US2016/067366 International Preliminary Report on Patentability dated Jun. 28, 2018.
PCT/US2016/068134 International Preliminary Report on Patentability dated Jul. 5, 2018.

(56) References Cited

OTHER PUBLICATIONS

PCT/US2017/029465 International Preliminary Report on Patentability dated Nov. 8, 2018.
PCT/US2018/028951 International Search Report and Written Opinion dated Aug. 10, 2018.
U.S. Appl. No. 15/589,847 Office Action dated Nov. 6, 2018.
U.S. Appl. No. 15/880,208 Office Action dated Aug. 7, 2018.
U.S. Appl. No. 15/958,398 Office Action dated Oct. 12, 2018.
U.S. Appl. No. 15/960,384 Office Action dated Jul. 12, 2018.
U.S. Appl. No. 16/209,892 Office Action dated Feb. 8, 2019.
Co-pending U.S. Appl. No. 16/378,363, filed Apr. 8, 2019.
PCT/US2018/063935 International Search Report and Written Opinion dated Mar. 22, 2019.
Cipolla et al. A tool for Emergency Detection with Deep Learning Neural Networks. KDWeb (2016) How to predict a disaster. ICAR—National Research Council of Italy—Palermo, Italy (10 pgs).
U.S. Appl. No. 15/371,117 Office Action dated Aug. 5, 2019.
U.S. Appl. No. 15/682,440 Office Action dated Jul. 10, 2019.
U.S. Appl. No. 16/378,363 Office Action dated Jul. 19, 2019.

\* cited by examiner

SYSTEM AND METHOD FOR CALL MANAGEMENT

RELATED APPLICATION

This application is a continuation of U.S. patent application Ser. No. 15/436,484, filed Feb. 17, 2017, which is a continuation of U.S. patent application Ser. No. 14/794,780 filed Jul. 8, 2015, which claims priority under 35 USC 119 from U.S. Provisional Application Ser. No. 62/021,709 filed on Jul. 8, 2014, titled SYSTEM AND METHOD FOR CALL MANAGEMENT, the entire disclosures of which are incorporated herein by reference.

FIELD OF THE INVENTION

The invention relates to communication systems and, more particularly, but not exclusively, to a call handling and routing associated with an urgent or emergency call.

BACKGROUND OF THE INVENTION

With the explosive growth in mobile devices, many people are initiating call related to urgent or emergency services using a wireless device or mobile phone. As such, the information associated with the caller or the location of the caller needs to be accurately identified. Current approaches do not provide an accurate location or often fails to provide sufficient information regarding the location. Therefore what is needed is a system and method that provides as much information as possible about a caller and the location of the caller to the emergency call handler.

SUMMARY OF THE INVENTION

A system and method are provided in accordance with the various aspects of the invention that provide information regarding a caller and a call location to the urgent or emergency call handler, which call may be referred to as a distress call. The foregoing is a summary and thus contains, by necessity, simplifications, generalizations and omissions of detail. Those skilled in the art will appreciate that the summary is illustrative only and is not intended to be in any way limiting. The inventive techniques and concepts described herein apply to wireless communications systems including the radio access systems of GSM, UMTS, LTE, LTE-Advanced, IEEE 802 (WiFi, WiMAN, WiMAX), Bluetooth, UWB and NFC.

BRIEF DESCRIPTION OF THE DRAWING

The foregoing summary, as well as the following detailed description, is better understood when read in conjunction with the appended drawings. For the purpose of illustrating the various aspects and embodiments of the invention, the drawings shown exemplary constructions of the aspects of the invention. However, the invention is not limited to the specific methods and instrumentalities disclosed in the drawings, which are as follows.

DETAILED DESCRIPTION OF ILLUSTRATIVE EMBODIMENTS

Illustrative embodiments as found in the various aspects of the invention are disclosed with reference to the figures, wherein like numerals refer to like features. Wireless devices have evolved in both operation and form-factors, converging the personal computer (PC) with the cellular phone, pager, and other communications devices. Besides communications functions (e.g. Voice Telephony, Short-message-service (SMS), Multi-media Messaging Service (MMS), TCP/IP data connectivity) and upgraded general processing power, sensors have been added to the wireless device. For instance, a wireless device (e.g. a smartphone, feature phone, netbook, Personal Digital assistant (PDA), tablet computer or PC with wireless LAN capability) may include:

Camera/Video functions;
Location data (Satellite-based);
Location data (Mobile-based);
Location data (Network-based);
Motion data (e.g. compass, accelerometer);
Capacitive Sensors;
Address Book, Contacts lists, recent called/emailed data; and
Application specific sensing, reading and monitoring capabilities.

Figure 1:
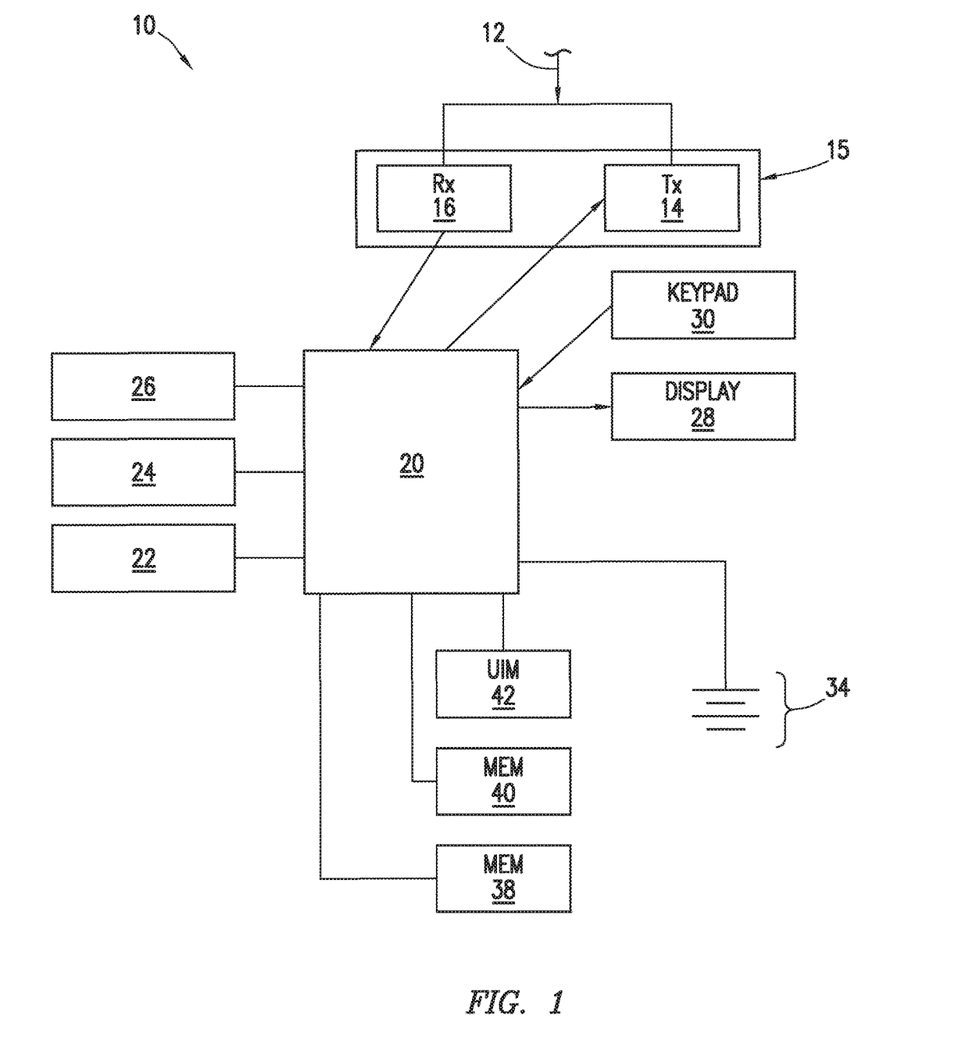
FIG. 1 shows a device within a wireless environment in accordance with the various aspects and embodiments of the invention.
Figure 2:
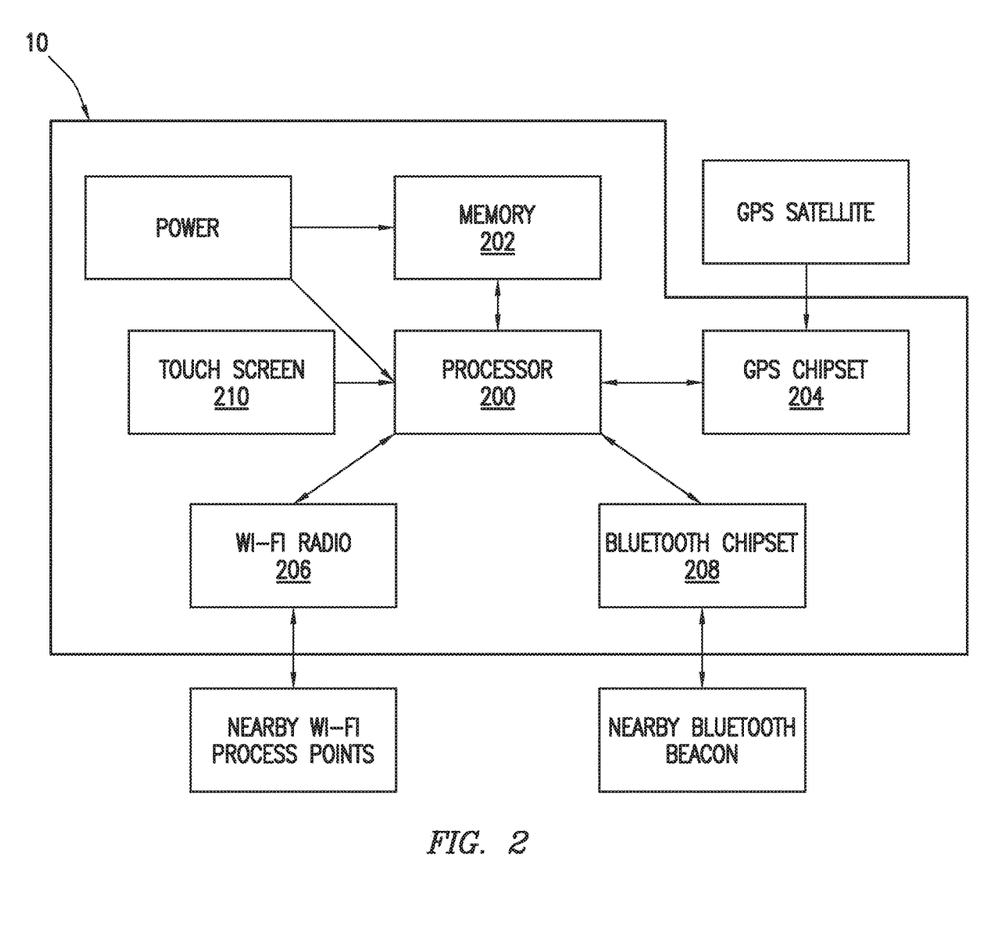
FIG. 2 shows functional elements of a device in accordance with the various aspects and embodiments of the invention.

Referring now to FIG. 1 and FIG. 2, based on the various aspects of the invention, illustrates a block diagram of a wireless device 10, which may also be a mobile telephone or a mobile terminal. It should be understood, however, that the wireless device 10, as illustrated and hereinafter described, is merely illustrative of one type of wireless device and/or mobile device that would benefit from embodiments of the invention and, therefore, should not be taken to limit the scope of embodiments of the invention. While several aspects and embodiments of the wireless and mobile device are illustrated and will be hereinafter described for purposes of example, other types of mobile terminals, such as portable digital assistants (PDAs), pagers, mobile televisions, gaming devices, laptop computers, cameras, video recorders, audio/video player, radio, GPS devices, or any combination of the aforementioned, and other types of voice and text communications systems, can readily employ aspects and embodiments of the invention.

The wireless device 10, as shown in FIG. 2, includes a processor module 200 and a memory module 202. Additionally, In accordance with some aspects of the invention, the wireless device 10 also includes a GPS module or chip 204 that is in communication with a GPS system or satellite. In accordance with some further aspects of the invention, the wireless device 10 includes a Wi-Fi communication module 206 capable of communicating with a nearby Wi-Fi access point or hotspot. In accordance with further aspects of the invention, the wireless device 10 includes a Bluetooth communication module 208 capable of initiating a Bluetooth communication session when a nearby Bluetooth beacon is detected. In accordance with aspects of the invention, the wireless device 10 also includes a display or touch screen 210 that is in communication with the processor module 200.

In addition, while several embodiments of the method of the invention are performed or used by a wireless device 10, the method may be employed by other than a mobile terminal. Moreover, while the system and method of embodiments of the invention will be primarily described in conjunction with mobile communications applications, it will be appreciated by one skilled in the art that the system and method of embodiments of the invention can be utilized in conjunction with a variety of other applications, both in the mobile communications industries and outside of the mobile communications industries.

Referring again to FIG. 1, the wireless device 10 includes an antenna 12 (or multiple antennae) in operable connection or communication with a transmitter 14 and a receiver 16 in accordance with one aspect of the invention. In accordance with other aspects of the invention, the transmitter 14 and the receiver 16 may be part of a transceiver 15. The wireless device 10 may further include an apparatus, such as a controller 20 or other processing element, which provides signals to and receives signals from the transmitter 14 and receiver 16, respectively. The signals include signaling information in accordance with the air interface standard of the applicable cellular system, and also user speech, received data and/or user generated data. In this regard, the wireless device 10 is capable of operating with one or more air interface standards, communication protocols, modulation types, and access types.

Figure 3:
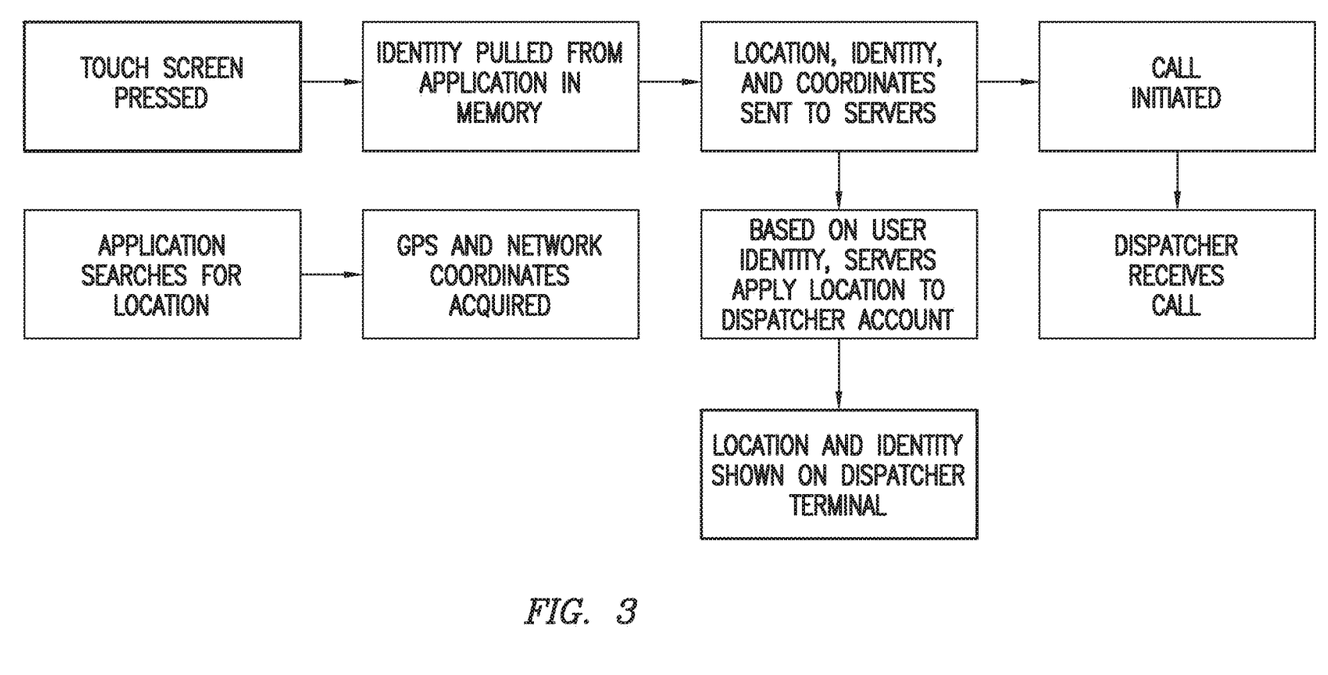
FIG. 3 shows a flow process that includes steps in initiating a call and routing the call in accordance with the various aspects and embodiments of the invention.

Referring now to FIG. 3 a process of sending a message to an urgent or emergency call handler is shown. The process is initiated, in accordance with some aspects of the invention, through a touch screen or display of the wireless device 10. The user initiates the process by pressing an icon or some specific location on the screen of the wireless device 10. The wireless device 10 sends a message, such as an SMS message, to a dispatcher or call handler. The dispatcher may also receive a call that is related to or associated with the message being delivered to the call handler. The message sent to the dispatcher or call handler may include information about the location of the caller.

For example, in accordance with the aspects of the invention, the message includes the location of the wireless device 10 based on or relative to a map. The dispatcher's system or computer runs an application or program that can receive the message, then the message is received by the dispatcher and the location of the wireless device 10 is shown on the map. Once the request from the wireless device 10 is initiated, identify information about the caller is retrieved from the memory of the wireless device 10. Additional information, in accordance with some aspects of the invention, including location and identity and coordinates is sent to the dispatcher's system from the wireless device 10. The call is initiated with the dispatcher and the dispatcher or call handler receives that call as well as the location and identity information. In accordance with some aspects of the invention, the caller's location is referenced with respect to a landmark or well known address. For example, the location is in relation to another object such as a landmark or address as "the caller is 100 feet north of the Statue of Liberty." Thus, there are several aspects of the invention that relate to providing location information or locating the caller and the scope of the invention is not limited thereby.

As will be apparent to one skilled in the art, the information may be sent, in accordance with the aspects of the invention, from the wireless device 10 to a remote location that collects the information associated with the initiation of the message and the wireless device 10 and send that in the form of a message to the dispatcher's system.

Figure 4:
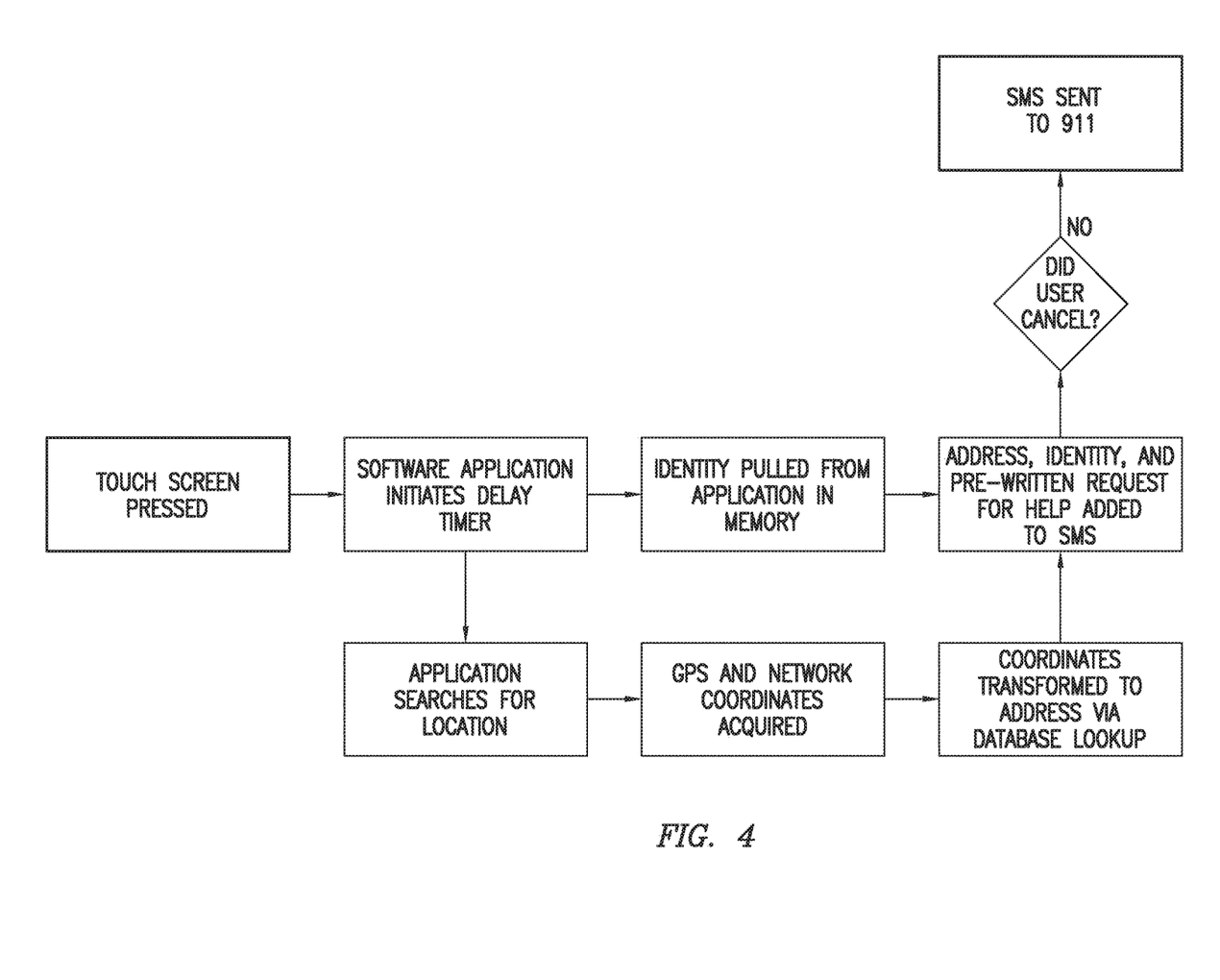
FIG. 4 shows a flow process for delivering a message in accordance with the various aspects and embodiments of the invention.

Referring now to FIG. 4, a process is shown for initiating a call. This time the message is delayed by an application running on the wireless device 10 while the application on the wireless device 10 searches for location information based on nearby networks, such as Wi-Fi or Bluetooth based networks, as well as GPS location information. The application can then add the additional information, as outlined below, to the message in the form of information or an SMS message.

The additional information, in accordance with some aspects of the invention, may include coordinates that are transformed into a local address via a database that is associated with the nearest Wi-Fi/Bluetooth network's physical location. This will help provide a higher degree of location information to the call handler. In accordance with further aspects of the invention, the SMS that is sent may include additional information, including the nature or reason for the call. In accordance with some aspects of the invention, the additional information includes specific information regarding the user. For example, the wireless devices 10 may have personal medical information for the caller, in the instance that the caller is the person in need of a medical assistance. In accordance with other aspects, the wireless device may include information—medical and non-medical—collected about the person in need of medical assistance. For example, the wireless device 10 may have captured a photo or a video—associated with the emergency situation or the location—that is provided as part of the additional information. In accordance with additional aspects of the invention the wireless device 10 can provide any other medical information or identifying information to allow the responder to better prepare for responding and easily locate or spot the message sender.

Figure 5:
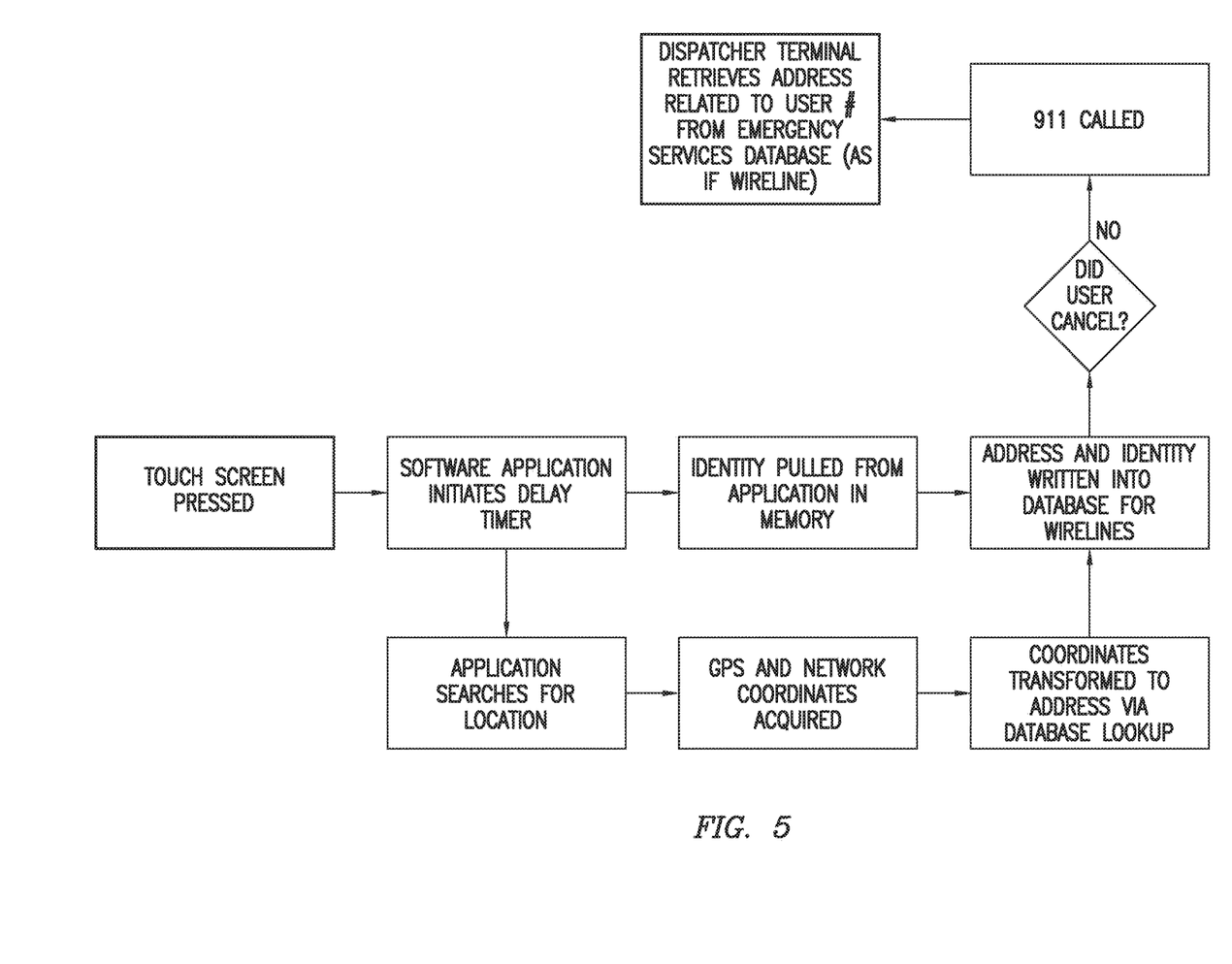
FIG. 5 shows a flow process that includes steps in initiating a call and routing the call to simulating a landline in accordance with the various aspects and embodiments of the invention.

Referring now to FIG. 5, in accordance with some aspects of the invention, a call is initiated through the touch screen of the wireless device 10 using a quick access simple tap or button selection. The call is delayed by the wireless device while the application on the device searches for location information based on nearby networks, such as Wi-Fi or Bluetooth based networks, as well as GPS location information. The application adds the additional information, as outlined in FIG. 5, to the call details. The additional information, in accordance with some aspects of the invention, may include coordinates that are transformed into a local address via a database that stores lookup information that is associated with the nearest Wi-Fi/Bluetooth network's physical location. This additional information is provided to the call handler such that the call handler detects a call and can retrieve address information that was written to the emergency database associated with this call before the call was routed to the call handler.

Figure 6:
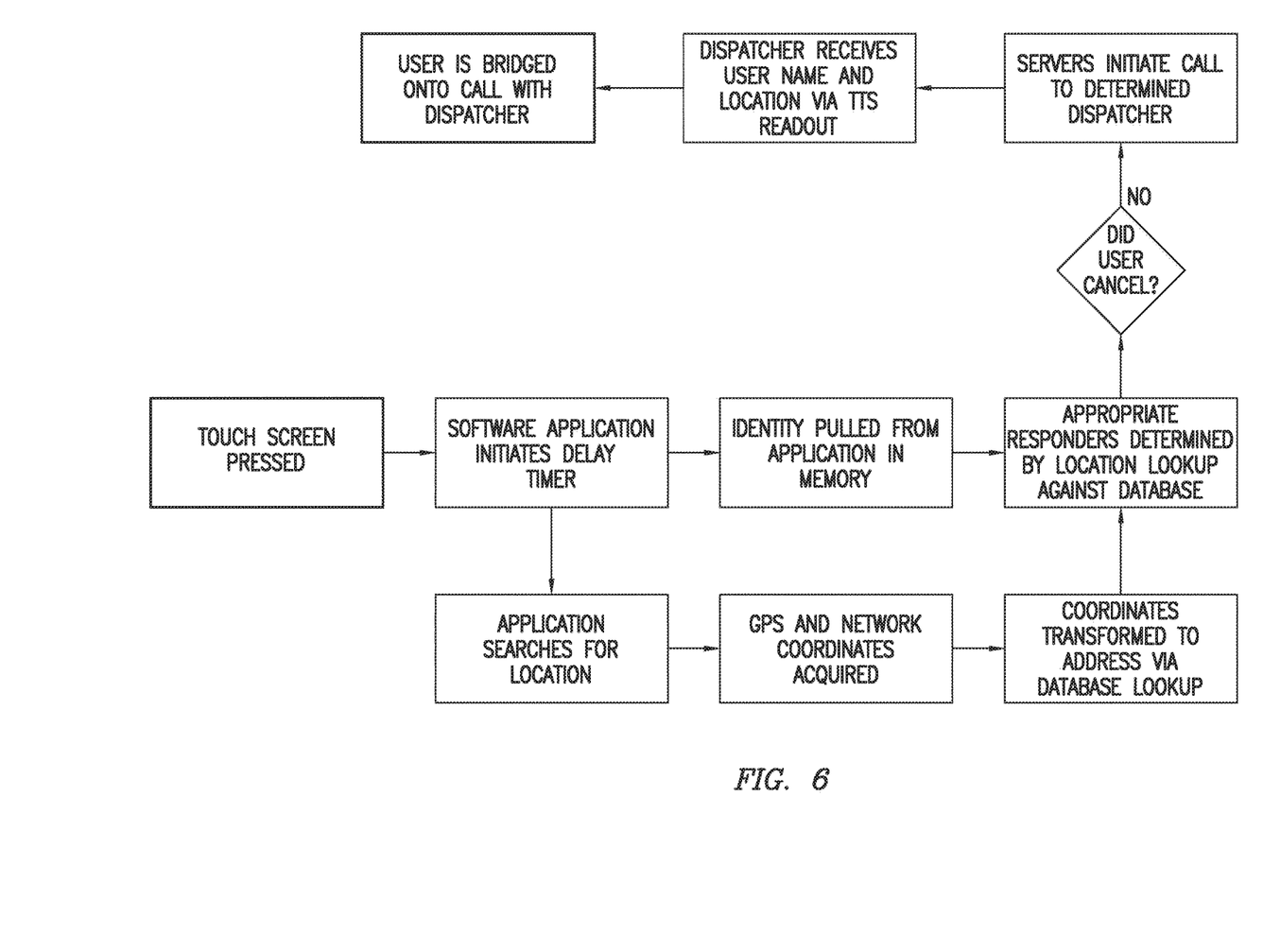
FIG. 6 shows a flow process that includes steps in initiating a call and routing the call to a call handler and a third party in accordance with the various aspects and embodiments of the invention.

Referring now to FIG. 6, in accordance with some aspects of the invention, a call is initiated through the touch screen of the wireless device 10 using a tap or button selection features on the touch screen for the purpose of initiating the call. In accordance with one aspect of the invention, the access button may be designed to initiate both an emergency call and a call to a location's private security. In accordance with other aspects and feature of the embodiments of the invention, there may be provided separate call initiation features on the touch screen that each provide a call to a respective call handler, with one being for 911 emergency call and the other being for a private call handler for help that does not rise to the level of 911 emergencies, such as assistance with automobile failure or other similar forms of help.

Once the call is initiated, the application on the wireless device 10 delays the call while the application on the wireless device 10 searches for location information based on nearby networks, such as Wi-Fi or Bluetooth based networks, as well as GPS location information. The application adds the additional information, as outlined in FIG. 5, to the call details. The additional information, in accordance with some aspects of the invention, may include coordinates that are transformed into a local address via a database that stores lookup information associated with the nearest Wi-Fi/Bluetooth network's physical location. This additional information is provided to the call handler, such that the call handler detects a call and can retrieve address information that was written to the emergency database associated with this call before the call was routed to the call handler. The call handler may receive the information in text form, on a display, as a text-to-speech file, or any other format that is required by the call handler. Once the information associated with the call is provided, the user is then bridged onto the call with the dispatcher.

In accordance with further aspects of the invention, the call that is initiated by the user at the touch screen may be routed to a remote server or location and any or all of the features performed at the wireless device 10, as outlined above, may be handled off the wireless device 10 by the remote location. Thus, when a request is received via user input on the touchscreen of the wireless device 10, this initiates the processor to look up in memory what to execute. The application and the user setting, in accordance with the various aspects of the invention, determine if the executed software application initiates the process of determining the smartphone's location or if that function is passed on to a remote server or location. For example, in accordance with one aspect of the invention, the GPS chipset 204 approximates position by continuously receiving the signal of the nearest satellites and then comparing signal strength. This provides initial latitude and longitudinal coordinates of the wireless device 10. In accordance with further aspects of the invention, the latitude and longitudinal coordinates are refined as the Wi-Fi radio processes the broadcast signal of the nearest access points. By comparing the relative strength of the nearby access point's signals to the known location of the access points, via software, a more accurate position is obtained. This further refines the given latitude and longitude coordinates.

In accordance with further aspects of the invention, if there is a nearby Bluetooth beacon, which is uniquely registered to a specific location or address, then that location is used to further enhance the location information for the initiated call and it is sent to the call handlers or emergency responders. If not, the Wi-Fi refined longitude and latitude GPS components are referenced against a database via an application programming interface to produce an identifiable address (reverse geo-coding).

Referring again to FIG. 4, in accordance with the various aspects of the invention, the address, either from the Bluetooth network or Wi-Fi refined GPS lookup, is then added to or inserted, by the software, into a programmatically created short message (SMS) along with user's name and a standard message. This programmatically created SMS is then sent to 911, dispatcher, call handler, and/or the emergency services, unless the user cancels the alert during the built in delay timer.

By way of illustration, the wireless device 10 is capable of operating in accordance with any of a number of first, second, third and/or fourth-generation communication protocols or the like. For example, the wireless device 10 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA2000, wideband CDMA (WCDMA) and time division-synchronous CDMA (TD-SCDMA), with fourth-generation (4G) wireless communication protocols or the like.

As an alternative (or additionally), the wireless device 10 may be capable of operating in accordance with non-cellular communication mechanisms. For example, the wireless device 10 may be capable of communication in a wireless local area network (WLAN) or other communication networks. The wireless device 10 can also have multiple networking capabilities including nomadic wired tethering, local-area-network transceivers (e.g. IEEE802 Wi-Fi), wide-area-network transceivers (IEEE 802.16 WiMAN/WiMAX, cellular data transceivers, (e.g. LTE) and short-range, data-only wireless protocols such as Ultra-wide-band (UWB), Bluetooth, RFID, Near-field-communications (NFC), etc.

A single site location based on the geographic location of the wireless network transmission antenna and the beacon ID (e.g. BTS ID, Cell ID, SSID) may be developed either by the wireless device 10, the remote location or the network; use of timing information of the signal path between the wireless device 10 and network may allow enhancement of the single site location. Using several beacon identities and power levels potentially may increase accuracy over a single site location using a power-difference-of-arrival technique.

Databases of beacon identifiers, beacon power levels, and network transmitter geographical locations may be uploaded to the wireless device 10 allowing for use of the aforementioned techniques using just the passive receiver(s) of the wireless device 10. A transmission (or series of transmissions) from the wireless device 10 is enough to localize a transmitter. An interaction of the wireless device 10 with the network where identifiers either physical (e.g. Electronic Serial Number, Media Access Control (MAC) address); or virtual (e.g. Temporary Mobile Station Identifier (TMSI) or IP address) can allow both localization and identification of the wireless device 10.

Referring again to FIG. 1 and now to FIG. 2, in accordance with the aspects of the invention, an exemplary instance of a system is shown. It is understood that the apparatus, such as the controller 20, may include circuitry desirable for implementing audio and logic functions of the wireless device 10. For example, the controller 20 may include a digital signal processor device, a microprocessor device, and various analog to digital converters, digital to analog converters, and other support circuits including digital signal processors. Control and signal processing functions of the wireless device 10 are allocated between these devices according to their respective capabilities and design. The controller 20 may also include the functionality to convolutionally encode and interleave message and data prior to modulation and transmission. The controller 20 can additionally include an internal voice coder, and may include an internal data modem. Further, the controller 20 may include functionality to operate one or more software programs, which may be stored in memory. For example, the controller 20 may be capable of operating a connectivity program, such as a conventional Web browser. The connectivity program may then allow the wireless device 10 to transmit and receive Web content, such as location-based content and/or other web page content, according to a Wireless Application Protocol (WAP), Hypertext Transfer Protocol (HTTP) and/or the like, for example.

The wireless device 10 may also comprise a user interface including an output device such as a conventional earphone or speaker 24, a ringer 22, a microphone 26, a display or touch screen 28, and a user input interface, all of which are coupled to the controller 20. The user input interface, which allows the wireless device 10 to receive data, may include any of a number of devices allowing the wireless device 10 to receive data, such as a keypad 30, a touch display (not shown) or other input device. In embodiments including the keypad 30, the keypad 30 may include the conventional numeric (0-9) and related keys (#, *), and other hard and soft keys used for operating the wireless device 10. Alternatively, the keypad 30 may include a conventional QWERTY keypad arrangement. The keypad 30 may also include various soft keys with associated functions. In addition, or alternatively, the wireless device 10 may include an interface device such as a joystick or other user input interface. The wireless device 10 further includes a battery 34, such as a vibrating battery pack, for powering various circuits that are required to operate the wireless device 10, as well as optionally providing mechanical vibration as a detectable output.

The wireless device 10 may further include a user identity module (UIM) 42. The UIM 42 is typically a memory device having a processor built in. The UIM 42 may include, for example, a subscriber identity module (SIM), a universal integrated circuit card (UICC), a universal subscriber identity module (USIM), a removable user identity module (R-UIM), etc. The UIM 42 typically stores information elements related to a mobile subscriber. In addition to the UIM 42, the wireless device 10 may be equipped with memory. For example, the wireless device 10 may include volatile memory 40, such as volatile Random Access Memory (RAM) including a cache area for the temporary storage of data. The wireless device 10 may also include other non-volatile memory 38, which can be embedded and/or may be removable. The non-volatile memory 38 can additionally or alternatively comprise an electrically erasable programmable read only memory (EEPROM), flash memory or the like. The memories can store any of a number of pieces of information, and data, used by the wireless device 10 to implement the functions of the wireless device 10. For example, the memories can include an identifier, such as an international mobile equipment identification (IMEI) code, capable of uniquely identifying the wireless device 10. Furthermore, the memories may store instructions for determining cell id information. Specifically, the memories may store an application program for execution by the controller 20, which determines an identity of the current cell, i.e., cell id identity or cell id information, with which the wireless device 10 is in communication.

Although not every element of every possible mobile network is shown and described herein, it should be appreciated that the wireless device 10 may be coupled to one or more of any of a number of different networks through a base station (not shown). In this regard, the network(s) may be capable of supporting communication in accordance with any one or more of a number of first-generation (1G), second-generation (2G), 2.5G, third-generation (3G), 3.9G, fourth-generation (4G) mobile communication protocols or the like. For example, one or more of the network(s) can be capable of supporting communication in accordance with 2G wireless communication protocols IS-136 (TDMA), GSM, and IS-95 (CDMA). Also, for example, one or more of the network(s) can be capable of supporting communication in accordance with 2.5G wireless communication protocols GPRS, Enhanced Data GSM Environment (EDGE), or the like. Further, for example, one or more of the network(s) can be capable of supporting communication in accordance with 3G wireless communication protocols such as a UMTS network employing WCDMA radio access technology. Some narrow-band analog mobile phone service (NAMPS), as well as total access communication system (TACS), network(s) may also benefit from embodiments of the invention, as should dual or higher mode mobile stations (e.g., digital/analog or TDMA/CDMA/analog phones).

The wireless device 10 can further be coupled to one or more wireless access points (APs) (not shown). The APs may comprise access points configured to communicate with the wireless device 10 in accordance with techniques such as, for example, radio frequency (RF), infrared (IrDA) or any of a number of different wireless networking techniques, including WLAN techniques such as IEEE 802.11 (e.g., 802.11a, 802.11b, 802.11g, 802.11n, etc.), world interoperability for microwave access (WiMAX) techniques such as IEEE 802.16, and/or wireless Personal Area Network (WPAN) techniques such as IEEE 802.15, BlueTooth (BT), ultra wideband (UWB) and/or the like. The APs may be coupled to the Internet (not shown). The APs can be directly coupled to the Internet. In accordance with other aspects of the invention, the APs are indirectly coupled to the Internet. Furthermore, in one embodiment, the BS may be considered as another AP. As will be appreciated, by directly or indirectly connecting the wireless devices 10 to the Internet, the wireless device 10 can communicate with other devices, a computing system, etc., to thereby carry out various functions of the wireless device 10, such as to transmit data, content or the like to, and/or receive content, data or the like from other devices. As used herein, the terms "data," "content," "information" and similar terms may be used interchangeably to refer to data capable of being transmitted, received and/or stored in accordance with the various aspects and embodiments of the invention. Thus, use of any such terms should not be taken to limit the spirit and scope of embodiments of the invention.

Although not shown, the wireless device 10 may communicate in accordance with, for example, RF, BT, IrDA or any of a number of different wireline or wireless communication techniques, including LAN, WLAN, WiMAX, UWB techniques and/or the like. One or more of the computing systems that are in communication with the wireless device 10 can additionally, or alternatively, include a removable memory capable of storing content, which can thereafter be transferred to the wireless device 10. Further, the wireless device 10 can be coupled to one or more electronic devices, such as displays, printers, digital projectors and/or other multimedia capturing, producing and/or storing devices (e.g., other terminals). Furthermore, it should be understood that embodiments of the invention may be resident on a communication device such as the wireless device 10, or may be resident on a network device or other device accessible to the wireless device 10.

In accordance with the various aspects of the invention, the wireless device 10 includes on board location systems.

While the on-board location systems (e.g. Global-Navigation-Satellite-System Receivers (GNSS)) may be used to develop a location estimate for the wireless device 10, the location of a wireless device 10 may be determined from the interaction (i.e. radio messaging) between the wires device 10 and the network (e.g. cellular system, WiMAN, WiMAX, WiFi, Bluetooth, NFC).

The true scope the invention is not limited to the various aspects of the invention or presently preferred embodiments disclosed herein and indeed could be applied to any reprogrammable remote sensing or other computing device with a wireless communications facility. For example, the foregoing disclosure of a presently preferred embodiment of the Intelligent Access Control System uses explanatory terms, such as mobile device, cellular system and wireless local area network and the like, which should not be construed so as to limit the scope of protection of the following claims, or to otherwise imply that the inventive aspects of the intelligent access control system are limited to the particular methods and apparatus disclosed. Moreover, as will be understood by those skilled in the art, many of the inventive aspects disclosed herein are based on software applications and operating systems running on generic hardware processing platforms. These functional entities are, in essence, programmable data collection, analysis, and storage devices that could take a variety of forms without departing from the inventive concepts disclosed herein. In many cases, the place of implementation (i.e., the functional element) described herein is merely a designer's preference and not a hard requirement. Accordingly, except as they may be expressly so limited, the scope of protection of the following claims is not intended to be limited to the specific embodiments described above.

It is noted that, as used in this description, the singular forms "a," "an" and "the" include plural referents unless the context clearly dictates otherwise. Reference throughout this specification to "one aspect," "another aspect," "one embodiment," "an embodiment," "certain embodiment," or similar language means that a particular aspect, feature, structure, or characteristic described in connection with the embodiment is included in at least one embodiment of the invention. Thus, appearances of the phrases "in one embodiment," "in at least one embodiment," "in an embodiment," "in certain embodiments," and similar language throughout this specification may, but do not necessarily, all refer to the same embodiment.

It will be apparent that various aspects of the invention as related to certain embodiments may be implemented in software, hardware, application logic, or a combination of software, hardware, and application logic. The software, application logic and/or hardware may reside on a server, an electronic device, or be a service. If desired, part of the software, application logic and/or hardware may reside on an electronic device and part of the software, application logic and/or hardware may reside on a remote location, such as server.

In accordance with the teaching of the invention and certain embodiments, a program or code may be noted as running on a computing device. A computing device is an article of manufacture. Examples of an article of manufacture include: a server, a mainframe computer, a mobile telephone, a multimedia-enabled smartphone, a tablet computer, a personal digital assistant, a personal computer, a laptop, or other special purpose computer each having one or more processors (e.g., a Central Processing Unit, a Graphical Processing Unit, or a microprocessor) that is configured to execute a computer readable program code (e.g., an algorithm, hardware, firmware, and/or software) to receive data, transmit data, store data, or perform methods. The article of manufacture (e.g., computing device) includes a non-transitory computer readable medium having a series of instructions, such as computer readable program steps encoded therein. In certain embodiments, the non-transitory computer readable medium includes one or more data repositories. The non-transitory computer readable medium includes corresponding computer readable program code and may include one or more data repositories. Processors access the computer readable program code encoded on the corresponding non-transitory computer readable mediums and execute one or more corresponding instructions.

Other hardware and software components and structures are also contemplated. Unless defined otherwise, all technical and scientific terms used herein have the same meaning as commonly understood by one of ordinary skill in the art to which this invention belongs. Although any methods and materials similar or equivalent to those described herein can also be used in the practice or testing of the invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or system in connection with which the publications are cited. The citation of any publication is for its disclosure prior to the filing date and should not be construed as an admission that the invention is not entitled to antedate such publication by virtue of prior invention. Further, the dates of publication provided may be different from the actual publication dates which may need to be independently confirmed.

All statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of the invention, therefore, is not intended to be limited to the exemplary embodiments shown and described herein. Rather, the scope and spirit of invention is embodied by the appended claims.

What is claimed is:

1. A computer-implemented method for providing an emergency message to an emergency service, the method comprising:
   a) receiving a user request from a wireless device to send an emergency message, wherein the user request is initiated through a user interface of the wireless device by a user of the wireless device;
   b) obtaining location information of the user from the wireless device;
   c) obtaining identity information of the user from the wireless device;
   d) collecting the location information of the user at a remote server;
   e) determining an appropriate emergency service to receive the emergency message based on the location information of the user;
   f) creating the emergency message by retrieving a pre-written request for help and inserting the location information and identity information into the pre-written request for help; and g) transmitting the emergency message comprising the pre-written request for help, the location information, and the identity information to the emergency service to be shown on a display to a dispatcher.

2. The method of claim 1, further comprising transforming the location information of the user into a local address before transmitting the emergency message to the emergency service.

3. The method of claim 1, wherein the emergency message is an SMS message.

4. The method of claim 2, wherein the local address further comprises a distance and direction relative to a landmark.

5. The method of claim 1, further comprising establishing an emergency call with the emergency service, wherein transmitting the emergency message to the emergency service is performed in response to successfully establishing the emergency call with the emergency service.

6. The method of claim 1, wherein the emergency message further comprises additional information associated with the wireless device, the additional information comprising one of medical information, photo, or video.

7. The method of claim 1, wherein the location information is provided to the emergency service through the emergency message as a text-to-speech file.

8. The method of claim 1, wherein the user request is initiated through the selection by the user of the wireless device of a particular call initiation feature corresponding to the emergency service from a plurality of call initiation features presented on the user interface, wherein each call initiation feature corresponds to a respective emergency service.

9. The method of claim 1, wherein the emergency service is a 911 call taking center.

10. The method of claim 1, wherein the emergency service is a private call handler.

11. A system comprising at least one processor and at least one memory including instructions that, when executed by the at least one processor, cause the at least one processor to perform steps comprising:
    a) receiving a user request from a wireless device to send an emergency message, wherein the user request is initiated through a user interface of the wireless device by a user of the wireless device;
    b) obtaining location information of the user from the wireless device;
    c) obtaining identity information of the user from the wireless device;
    d) collecting the location information of the user at a remote server;
    e) determining an appropriate emergency service to receive the emergency message based on the location information of the user;
    f) creating the emergency message by retrieving a pre-written request for help and inserting the location information and identity information into the pre-written request for help; and
    g) transmitting the emergency message comprising the pre-written request for help, the location information, and the identity information to the emergency service to be shown on a display to a dispatcher.

12. The system of claim 11, further configured for transforming the location information of the user into a local address before transmitting the emergency message to the emergency service.

13. The system of claim 11, wherein the emergency message is an SMS message.

14. The system of claim 12, wherein the local address further comprises a distance and direction relative to a landmark.

15. The system of claim 11, further configured for establishing an emergency call with the emergency service, wherein transmitting the emergency message to the emergency service is performed in response to successfully establishing the emergency call with the emergency service.

16. The system of claim 11, wherein the emergency message further comprises additional information associated with the wireless device, the additional information comprising one of medical information, photo, or video.

17. The system of claim 11, wherein the location information is provided to the emergency service through the emergency message as a text-to-speech file.

18. The system of claim 11, wherein the user request is initiated through the selection by the user of the wireless device of a particular call initiation feature corresponding to the emergency service from a plurality of call initiation features presented on the user interface, wherein each call initiation feature corresponds to a respective emergency service.

19. The system of claim 11, wherein the emergency service is a 911 call taking center.

20. The system of claim 11, wherein the emergency service is a private call handler.

* * * * *